(12) United States Patent
Vijayakar et al.

(10) Patent No.: US 11,062,239 B2
(45) Date of Patent: Jul. 13, 2021

(54) STRUCTURING COMPUTER-MEDIATED COMMUNICATION AND DETERMINING RELEVANT CASE TYPE

(71) Applicant: BANK OF AMERICA CORPORATION, Charlotte, NC (US)

(72) Inventors: Aneesh Pravin Vijayakar, Charlotte, NC (US); Vinaykumar S. Mummigatti, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 287 days.

(21) Appl. No.: 15/898,556

(22) Filed: Feb. 17, 2018

(65) Prior Publication Data
US 2019/0258738 A1 Aug. 22, 2019

(51) Int. Cl.
| | | |
|---|---|---|
| *G06Q 10/06* | (2012.01) | |
| *G06F 16/33* | (2019.01) | |
| *G06F 16/90* | (2019.01) | |
| *G06F 16/178* | (2019.01) | |
| *G06F 40/205* | (2020.01) | |

(52) U.S. Cl.
CPC ....... *G06Q 10/063* (2013.01); *G06F 16/1794* (2019.01); *G06F 16/3334* (2019.01); *G06F 16/90* (2019.01); *G06F 40/205* (2020.01)

(58) Field of Classification Search
CPC ............... G06F 11/07; G06F 17/30867; G06F 16/3334; G06F 16/90; G06F 16/1794; G06F 40/205; G06Q 10/063
USPC ........................................................ 707/722
See application file for complete search history.

(56) References Cited

U.S. PATENT DOCUMENTS

| | | |
|---|---|---|
| 7,174,507 B2 | 2/2007 | Baudin et al. |
| 8,380,716 B2 | 2/2013 | Mirus |
| 8,589,482 B2 | 11/2013 | Tiu, Jr. et al. |
| 8,752,030 B1 | 6/2014 | Chen et al. |

(Continued)

OTHER PUBLICATIONS

"Bridging the Unstructured and Structured Worlds: An Adaptive Self-Learning Medical Form Genereting System;" Shuai Zheng, Fusheng Wang; James J. Lu; 2012 ACM; Maui, Hawaii, USA.*

(Continued)

*Primary Examiner* — Giovanna B Colan
(74) *Attorney, Agent, or Firm* — Michael A. Springs; Moore & Van Allen PLLC; James C. Edwards

(57) ABSTRACT

A system, method and the like for structuring computer-mediated communication data, such as social media data, determining a relevant operations management case/event type(s) based at least on the structured data and generating an applicable case type-specific workflow for the case implementing the structured data. Unstructured data is received, from various different computer-mediated communication channels and/or related listeners, and transformed into structured data. Additionally, data originating at various different computer-mediated communication channels is translated into a format that is operations management tool-agnostic and vice versa. Moreover, in response to structuring the computer-mediated communication data, one or more case/event types are determined that are applicable to the computer-mediated communication data and one or more case-type specific workflows are generated implementing the structured data.

13 Claims, 10 Drawing Sheets

(56) References Cited

U.S. PATENT DOCUMENTS

| | | | |
|---|---|---|---|
| 8,943,054 B2 | 1/2015 | Caruso | |
| 8,996,496 B2 | 3/2015 | Stiers | |
| 9,064,236 B2 | 6/2015 | Gazetov et al. | |
| 9,148,392 B1 | 9/2015 | Kelly et al. | |
| 9,336,268 B1* | 5/2016 | Moudy | G06F 16/24578 |
| 9,336,325 B2 | 5/2016 | Bamford | |
| 9,449,080 B1* | 9/2016 | Zhang | G06F 40/30 |
| 9,635,081 B2 | 4/2017 | Stiers | |
| 9,648,114 B2 | 5/2017 | Carmichael et al. | |
| 9,692,722 B2 | 6/2017 | Verma et al. | |
| 10,528,633 B2* | 1/2020 | Altaf | G06F 16/313 |
| 2003/0167266 A1* | 9/2003 | Saldanha | G06F 40/143 |
| 2004/0163043 A1* | 8/2004 | Baudin | G06F 16/313 |
| | | | 715/234 |
| 2011/0078584 A1 | 3/2011 | Winterstein et al. | |
| 2011/0202544 A1 | 8/2011 | Carle et al. | |
| 2012/0036200 A1 | 2/2012 | Cole et al. | |
| 2012/0036204 A1 | 2/2012 | Cole | |
| 2012/0036206 A1 | 2/2012 | Cole | |
| 2012/0036207 A1 | 2/2012 | Cole et al. | |
| 2012/0296628 A1 | 11/2012 | Wren et al. | |
| 2013/0132339 A1 | 5/2013 | Mirus | |
| 2013/0166721 A1* | 6/2013 | Soffer | G06Q 50/01 |
| | | | 709/224 |
| 2014/0040374 A1 | 2/2014 | Olsen et al. | |
| 2014/0229541 A1 | 8/2014 | Dilio et al. | |
| 2015/0067043 A1 | 3/2015 | Agarwal et al. | |
| 2015/0081674 A1 | 3/2015 | Ali et al. | |
| 2015/0088981 A1 | 3/2015 | Brousseau et al. | |
| 2015/0100586 A1 | 4/2015 | Caruso | |
| 2015/0256475 A1* | 9/2015 | Suman | G06F 9/5027 |
| | | | 709/226 |
| 2016/0070800 A1* | 3/2016 | Malkin | G06F 16/245 |
| | | | 707/754 |
| 2016/0098661 A1 | 4/2016 | Viswanathan et al. | |
| 2017/0142930 A1 | 5/2017 | Huang et al. | |
| 2017/0161277 A1 | 6/2017 | Eulenstein et al. | |
| 2017/0293864 A1* | 10/2017 | Oh | G06F 16/24578 |
| 2017/0308909 A1* | 10/2017 | Faith | G06K 9/00315 |
| 2017/0351560 A1* | 12/2017 | Smith, Jr. | G06F 11/3664 |
| 2018/0004848 A1* | 1/2018 | Zeng | H04L 67/22 |
| 2018/0210957 A1* | 7/2018 | Altaf | G06F 16/9535 |
| 2019/0130243 A1* | 5/2019 | Penubothula | G06N 5/048 |

OTHER PUBLICATIONS

"Knowledge Rich Natural Language Queries over Structured Biological Databases;" Hasan M. Jamil; ACM 2017; Boston, MA, USA.*

* cited by examiner

STRUCTURING COMPUTER-MEDIATED COMMUNICATION AND DETERMINING RELEVANT CASE TYPE

FIELD OF THE INVENTION

The present invention is generally directed to computer data processing and, more specifically, structuring computer-mediated communication data, determining a relevant case type based on the structured data and generating a case workflow of the relevant case type using the structured data.

BACKGROUND

In conventional operations/process management within a business entity, generally referred to as Business Process Management (BPM), a user enters data into a related tool/software application and the system creates a case, otherwise referred to as an event, which triggers a process/workflow for resolving the case. In this regard, the tool/software application will conduct multiple handshake operations with various ancillary systems that act on information associated with the case/event.

Computer-mediated communication data, such as social media data and the like has heretofore been underutilized by business entities, which have a desire to use such data as the impetus for creating various different types of operations management; e.g., servicing customers, attracting new customers and the like.

Specifically, in current business environments, the computer-mediated communication data is originated at numerous different computer-mediated communication channels (e.g., social media websites and the like) and may be collected by various computer-mediated communication listeners (e.g., social media listeners). The listeners have the ability to determine which of the communications are relevant to the entity based on keywords, key phrases and the like. In turn, the listeners communicate a data feed including the relevant computer-mediated communication data to the business entity. However, the computer-mediated communication data that is communicated to the entity is in an unstructured format (i.e., raw data) and, as such, is incapable of being readily processed by the engines/tools/software applications associated with operations management (e.g., BPM engines and the like). This means that the unstructured data must be manually analyzed to determine its relevance and its applicability to specific type of operations management. The manual nature of such a process is not only inefficient from a time standpoint but also lends itself to being inconsistent in terms of how standard procedures and regulations are applied; i.e., inconsistencies as to which computer-mediated communication events (e.g., social media events) give rise to an business entity's operations/process management event/case.

Moreover, in large business entities many disparate operations management engines may be utilized. However, the data provided by computer-mediated communication channels and/or related computer-mediated communication is formatted such that it is not readily able to be seamlessly processed by the various different operations management engines (e.g., BPM engines and the like).

Therefore, a need exists to align computer-mediated communication data with operations management processing. In this regard a need exists to create a process in which the unstructured data provided by a computer-mediated communication channel and/or associated listener is automatically converted to structured data. In addition, a need exists to provide the unstructured and/or structured data to various disparate operations management engines in a format that is conducive to seamless processing of the data. Moreover, a need exists identify the case/event type associated with the computer-mediated communication data and, in response to identifying the case/event type, generate an associated workflow for the case/event using the structured data as the basis for the case/event.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing systems, methods, computer program product and/or the like for structuring computer-mediated communication data, such as social media data, determining a relevant operations management case/event type(s) based at least on the structured data and generating an applicable case type-specific workflow for the case implementing the structured data.

In this regard, the present invention is capable of receiving, from various different computer-mediated communication channels and/or related listeners, unstructured data (e.g., raw data feeds) and transforming the unstructured data into structured data. In specific embodiments of the invention the transformation occurs by parsing the unstructured data for keywords and identifying tasks, feedback, activities, queries or the like associated with the keywords, collectively referred to herein as an unstructured data case workflow. In response to identifying the tasks, feedback, activities and/or queries related to the data, collectively referred to herein as task data is communicated back to the computer-mediated communication channels, typically via the related listeners. The computer-mediated communication channels provide responses to the task data (either through contact with the user who generated the initial computer-mediated communication, e.g., social media post and/or accessing user profile databases), which are communicated back to the interested entity as structured data.

In addition, the present invention is further configured to translating data originating at various different computer-mediated communication channels to a format that is operations management tool-agnostic (i.e., any of various different operations management engines e.g., BPM engines) implemented by the interested entity can process the unstructured and/or structured data created at the various different computer-mediated communication channels. In addition, the invention provides for data originating at the various different operations management engines to be translated into a format that is computer-mediated communication channel-agnostic and/or listener-agnostic, such that, any different listener and/or channel can process the data originating at the various different operations management engines.

Moreover, in response to structuring the computer-mediated communication data (i.e., the social media post data), the present invention provides for determining one or more case/event types that are applicable to the computer-mediated communication data and generating one or more case-type specific associated case/event workflows implementing the structured data.

A system for structuring computer-mediated data and determining a case type associated with a structured computer-mediated data defines first embodiments of the invention. The system includes a computing platform that is disposed within a distributed communication network. The computer platform includes a memory and at least one processor in communication with the memory.

The system further includes a translation engine, otherwise referred to herein as a core process framework, which is stored in the memory and executable by the at least one processor. The translation engine is configured to receive unstructured data from one of a plurality of computer-mediated communication channels (e.g., social media channels or the like). In specific embodiments of the system the translation engine receives the unstructured data indirectly from the computer-mediated communication channels via a computer-mediated communication channel listener (e.g., social media listener or the like).

The translation is engine is further configured to translate the unstructured data into a first generic format that is operations management engine-agnostic (i.e., suitable for processing by any operations management engine) and initiate network communication of the unstructured data in the first generic format to at least one operations management engine.

The system further includes at least one operations management engine that is stored in the memory and executable by the at least one processor. The operations management engine is configured to receive the unstructured data in the first generic format and translate the unstructured data from the first generic format to an operations management engine-specific format.

The operations management engine is further configured to initiate transformation of the unstructured data into structured data, determine a case type for the structured data, and in response to determining the structured case type, generate a case workflow of the determined case type using the structured data.

In specific embodiments of the system the at least one operations management engine is configured to initiate transformation of the unstructured data into structured data by (i) parsing the unstructured data to identify one or more predetermined keywords, (ii) identifying one or more tasks (e.g., activities, queries, feedback or the like) based on the predetermined keywords, (iii) initiating network communication of the task data associated with the one or more tasks to at least one of the plurality of computer-mediated communication channels, and (iv) receiving, from the at least one of the plurality of computer-mediated communication channels, in response to performing at least one of the one or more tasks, response data associated with the one or more tasks, such that the response data is structured data. In further specific embodiments the translation engine is further configured to (i) receive, from an operations management engine, the task data, (ii) translate the task data into a second generic format that is computer-mediated communication listener-agnostic, and (iii) initiate network communication of the task data in the second generic format to a computer-mediated communication listener (e.g., social media listener or the like). The computer-mediated communication listener translates the task data to a computer-mediated communication channel-specific format, and initiates communication of the task data in the computer-mediated communication channel-specific format to the at least one of the plurality of computer-mediated communication channels. In further specific embodiments of the system, the translation engine is further configured to (i) receive, from the computer-mediated communication listener, the response data, (ii) translate the response data into the first generic format and (iii) initiate network communication of the response data in the first generic format to the at least one operations management engine.

In further specific embodiments of the system the operations management engine(s) is further configured to determine an initial case type(s) for the unstructured data (e.g., in response to parsing unstructured data for the keywords), and determine a final case type(s) for the structured data. In such embodiments of the system, the initial case type and the final case type may be the same case type or different case types.

In further specific embodiments of the system, the at least one operations management engine is further configured to publish at least one of profile data or campaign data to at least one of the computer-mediated communication channels. In such embodiments of the system, the at least one operations management engine is further configured to publish at least one of profile data or campaign data to at least one of the computer-mediated communication channels by initiating network communication of the profile data of campaign data in the operations management engine-specific format to the translation engine. In response to receiving the profile data and/or campaign data, the translation engine is further configured to translate the profile data or the campaign data into the second generic format and initiate network communication of the profile data or the campaign data in the second generic format to the computer-mediated communication listener. In response, the computer-mediated communication listener initiates publishing of the profile data or the campaign data to at least one of the computer-mediated communication channels. In further specific embodiments of the system, the at least one operations management engine is further configured to, in response to publication at least one of the profile data or the campaign data to at least one of the computer-mediated communication channels, receive feedback data from the at least one of the computer-mediated communication channels. In such embodiments of the system, the translation engine is further configured to (i) receive, from at least one of the computer-mediated communication channels, the feedback data, (ii) translate the feedback data into the first generic format, and (iii) initiate network communication of the feedback data in the first generic format to the at least one operations management engine and the at least one operations management engine is configured to translate the feedback data from the first generic format to the operations management engine-specific format.

A computer-implemented method for structuring computer-mediated data and determining a case type associated with a structured computer-mediated data defines second embodiments of the invention. The method is implemented by one or more computing processors. The method includes receiving, from one of a plurality of computer-mediated communication channels, unstructured data, translating the unstructured data into a first generic format that is operations management engine-agnostic and initiating network communication of the unstructured data in the first generic format to at least one operations management engine. The method further includes receiving, at the operations management engine, the unstructured data in the first generic format, translating the unstructured data from the first generic format to an operations management engine-specific format, and initiating transformation of the unstructured data into structured data. The method further includes determining a case type for the structured data, and, in response to determining the case type, generating a case workflow of the case type using the structured data.

In specific embodiments of the method, initiating transformation of the unstructured data into structured data further includes parsing the unstructured data to identify one or more predetermined keywords, identifying one or more tasks based on the predetermined keywords, initiating network communication of the task data associated with the one or more tasks to at least one of the plurality of computer-mediated communication channels, and receiving, from the at least one of the plurality of computer-mediated communication channels, in response to performing at least one of the one or more tasks, response data associated with the one or more tasks. In other specific related embodiments of the method, initiating network communication of the task data associated with the one or more tasks to at least one of the plurality of computer-mediated communication channels further includes translating the task data into a second generic format that is computer-mediated communication listener-agnostic, and initiating network communication of the task data in the second generic format to a computer-mediated communication listener. In such embodiments of the method, the computer-mediated communication listener translates the task data to a computer-mediated communication channel-specific format, and initiates communication of the task data in the computer-mediated communication channel-specific format to the at least one of the plurality of computer-mediated communication channels. In other specific related embodiments of the method, receiving the response data associated with the one or more tasks further includes receiving, from the computer-mediated communication listener, the response data, translating the response data into the first generic format, and initiating network communication of the response data in the first generic format to the at least one operations management engine.

A computer program product including a non-transitory computer-readable medium defines third embodiments of the invention. In such embodiments of the invention, the computer-readable medium includes a first set of codes for causing a computer to (i) receive, from one of a plurality of computer-mediated communication channels, unstructured data, (ii) translate the unstructured data into a first generic format that is operations management engine-agnostic and (iii) initiate network communication of the unstructured data in the first generic format to at least one operations management engine. The computer-readable medium additionally includes a second set of codes for causing a computer to (i) receive, at the operations management engine, the unstructured data in the first generic format, (ii) translate the unstructured data from the first generic format to an operations management engine-specific format, (iii) initiate transformation of the unstructured data into structured data, (iv) determine a case type for the structured data; and (v) in response to determining the case type, generate a case workflow of the case type using the structured data.

In specific embodiments of the computer program product the second set of codes for causing the computer to (iii) initiate transformation of the unstructured data into structured data is further configured to (a) parse the unstructured data to identify one or more predetermined keywords, (b) identify one or more tasks based on the predetermined keywords, (c) initiate network communication of the task data associated with the one or more tasks to at least one of the plurality of computer-mediated communication channels, and (d) receive, from the at least one of the plurality of computer-mediated communication channels, in response to performing at least one of the one or more tasks, response data associated with the one or more tasks.

In other specific embodiments of the computer program product the second set of codes for causing the computer to (c) initiate network communication of the task data associated with the one or more tasks to at least one of the plurality of computer-mediated communication channels is further configured to translate the task data into a second generic format that is computer-mediated communication listener-agnostic, and initiate network communication of the task data in the second generic format to a computer-mediated communication listener. In such embodiments of the computer program product, the computer-mediated communication listener translates the task data to a computer-mediated communication channel-specific format, and initiates communication of the task data in the computer-mediated communication channel-specific format to the at least one of the plurality of computer-mediated communication channels.

Thus, according to embodiments of the invention, which will be discussed in greater detail below, the present invention provides for structuring computer-mediated communication data, such as social media data, determining a relevant operations management case/event type(s) based at least on the structured data and generating an applicable case type-specific workflow for the case implementing the structured data. In this regard, the present invention is capable of receiving, from various different computer-mediated communication channels and/or related listeners, unstructured data (e.g., raw data feeds) and transforming the unstructured data into structured data. In addition, the present invention provides for translating data originating at various different computer-mediated communication channels to a format that is operations management tool-agnostic and vice versa. Moreover, the present invention provides for, in response to structuring the computer-mediated communication data (i.e., the social media post data), determining one or more case/event types that are applicable to the computer-mediated communication data and generating one or more case-type specific associated case/event workflows implementing the structured data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
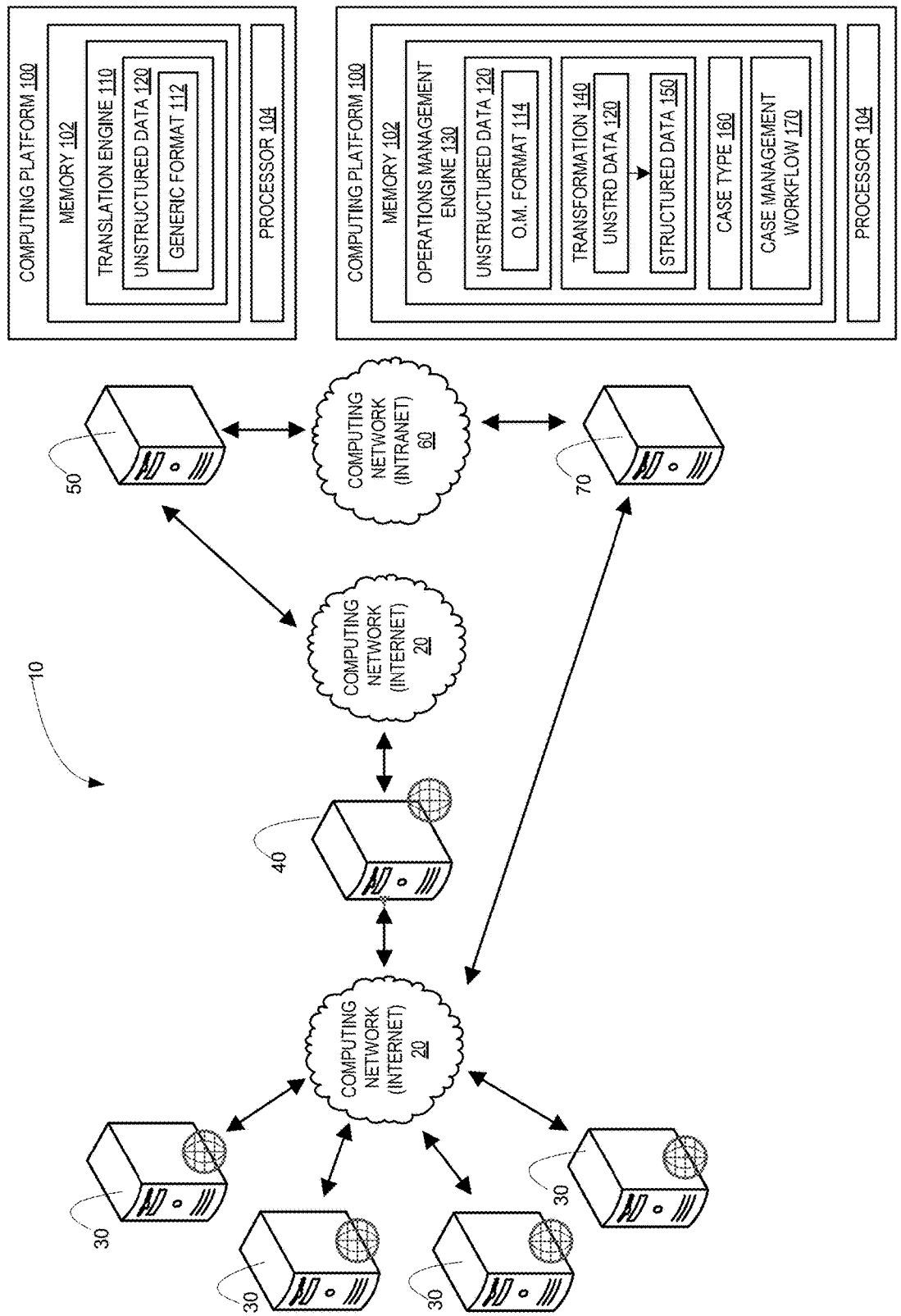
Figure 2:
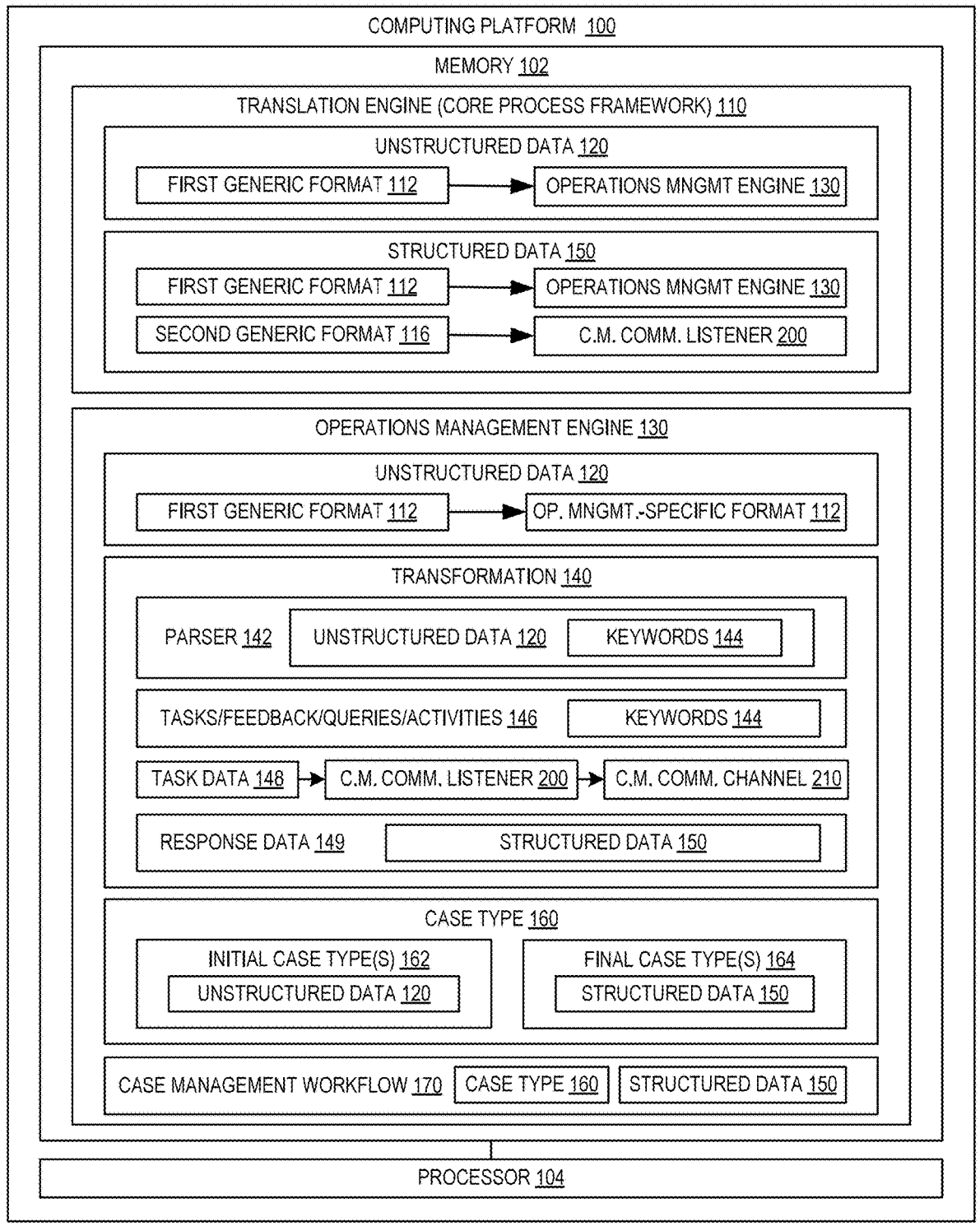
Figure 3:
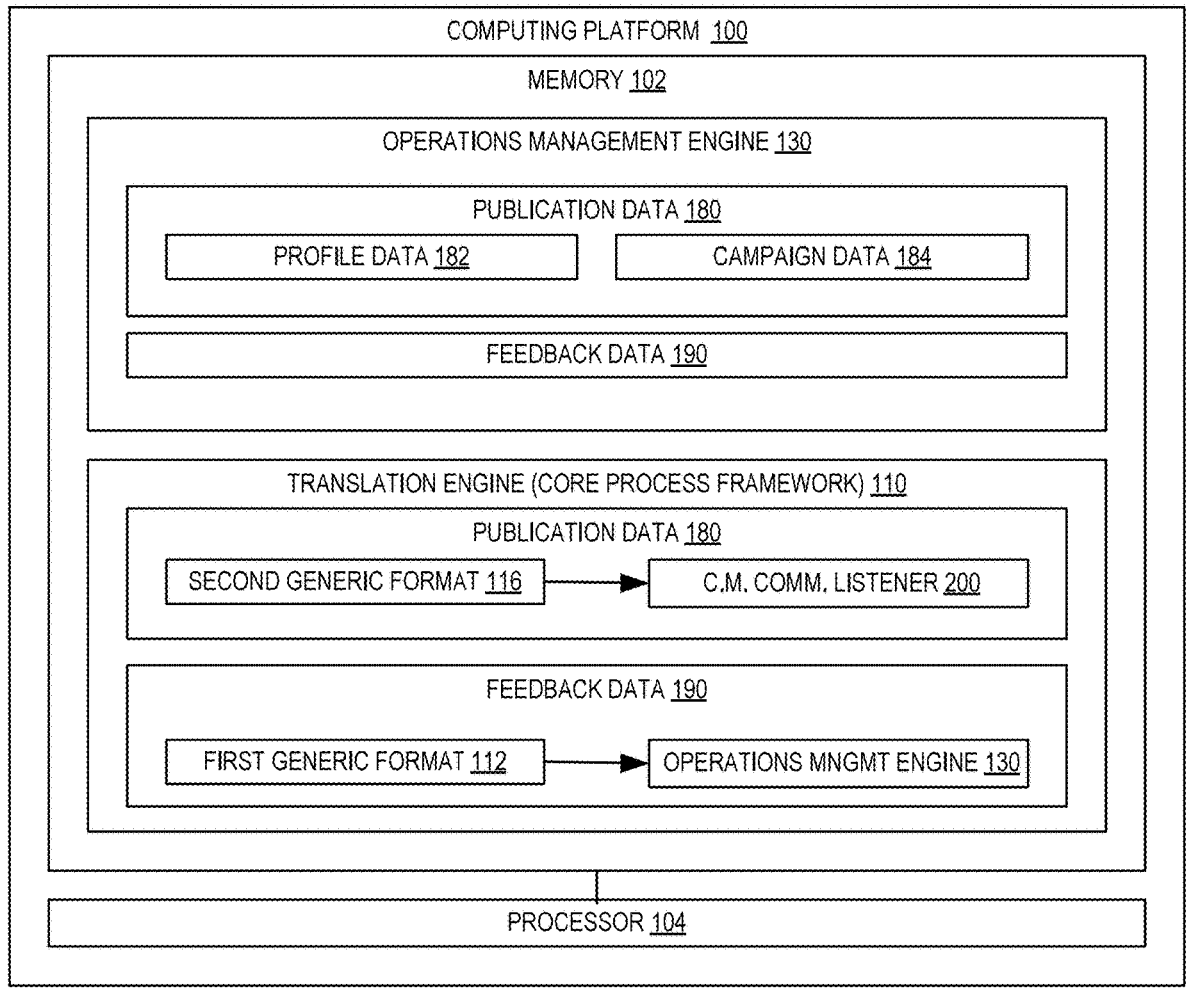
Figure 4:
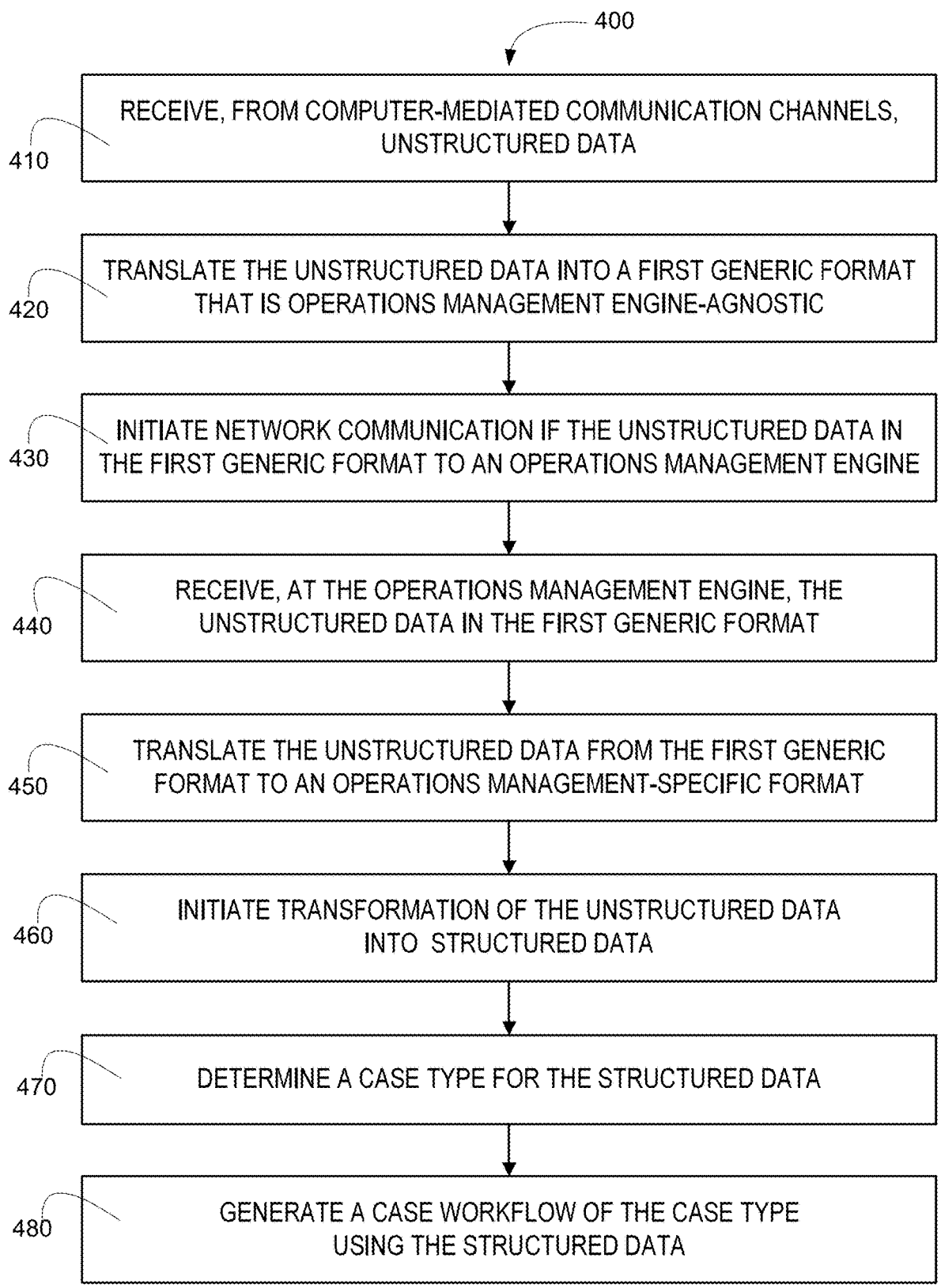
Figure 5:
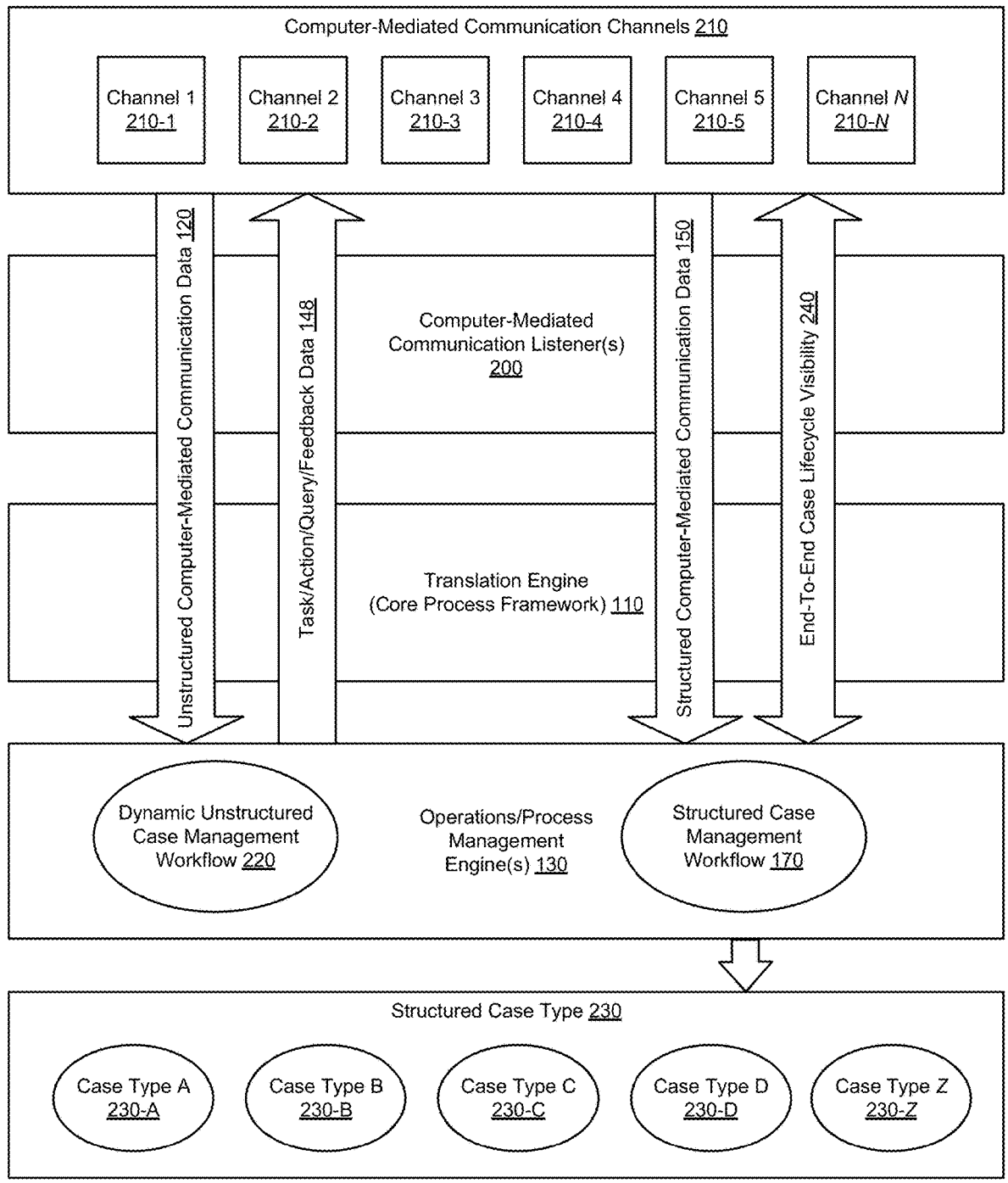

Having thus described embodiments of the invention in general terms, reference will now be made the accompanying drawings, wherein:

FIG. 1 provides a schematic diagram of a system for structuring computer-mediated communication data, determining case/event-type for operations management and generating an applicable case-type specific workflow, in accordance with embodiments of the invention;

FIGS. 2 and 3 provide block diagrams of a computer platform for structuring computer-mediated communication data, determining case/event-type for operations management and generating an applicable case-type specific workflow, in accordance with embodiments of the invention;

FIG. 4 provides a flow diagram of a method for structuring computer-mediated communication data, determining case/event-type for operations management and generating an applicable case-type specific workflow, in accordance with embodiments of the invention;

FIG. 5 provides a block diagram of a system for structuring computer-mediated communication data, determining case/event-type for operations management and generating an applicable case-type specific workflow; and FIGS. 6-10 provide schematic diagrams of specific patterns for aligning computer-mediated communication with operations management, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, computer-mediated communication data, such as social media data is transformed from unstructured to structured data and, in response to such a transformation, relevant operations management case/event type(s) is determined and an applicable case type-specific workflow is generated for the case based on the structured data.

In specific embodiments of the invention, the transformation of the data from unstructured to structured occurs by parsing the unstructured data for keywords and identifying tasks, feedback, activities, queries or the like associated with the keywords, collectively referred to herein as an unstructured data case workflow. In response to identifying the workflow related to the unstructured data, task data is communicated back to the computer-mediated communication channels, typically via the related listeners and structured data responses are received.

In additional specific embodiments of the invention, data originating at various different computer-mediated communication channels is translated to a format that is operations management tool-agnostic (i.e., any of various different operations management engines, e.g., BPM engines). In addition, the present invention provides translating data originating at the various different operations management engines into a format that is computer-mediated communication channel-agnostic and/or listener-agnostic, such that, any different listener and/or channel can process the data originating at the various different operations management engines.

Moreover, embodiments of the present invention provide for determining one or more case/event types that are applicable to the computer-mediated communication data and generating one or more case-type specific structured workflows based on the transformed structured data.

Additionally, the present invention provides for systems, methods and the like for publishing data, such as profile data and campaign data to computer-mediated communication channels, such as social media channels and, in response to such publications, receiving feedback from the computer-mediated communication channels.

Referring to FIG. 1 a schematic diagram is shown of a system 10 for structuring computer-mediated communication data, determining operation management case/event types and generating case type-specific workflow(s) based on the structured data, in accordance with embodiments of the present invention. The system 10 is operated within a distributed computing network that may include the Internet 20 and/or one or more intranet 60, cellular networks or the like. The system includes a plurality of web-based servers 30 that host computer-mediated communication channels, such as social media websites (e.g., FACEBOOK®, TWITTER®, INSTAGRAM®, PINTEREST®, TUMBLR®, LINKEDIN® and the like) or the like. The computer-mediated communication channel web-based servers 30 are in network communication (i.e., Internet 20) with one or more web-based servers 40 that host computer-mediated communication listener engines/tools that are configured to "listen" to the various different computer-mediated communication channels and mine data relevant to entities that subscribe to the listener. In this regard, the listener is configured to discern which computer-mediated communications, i.e., social media posts are relevant or otherwise of interest to an entity, such as a business or the like based on predefined parameters (e.g., search criteria) provided to by the entity.

The computer mediated communication listener web-based server(s) 40 is in network communication (i.e., Internet 20) with server 50 associated with an entity, such as business entity implementing the herein disclosed invention. One of ordinary skill in the art will recognize that requisite firewalls and gateway devices may be disposed between the computer mediated communication listener web-based server(s) 40 and server 50. Server 50 includes computing platform 100 having a memory 102 and at least one processor/processing device 104 in communication with the memory 102. The memory 102 stores translation engine 110, otherwise referred to as core process framework, which is executable by the processor 104 and configured to receive, from the computer-mediated communication listener web-based server(s) 40, unstructured data 120, in the form of a raw data feed of the computer-mediated communication data (e.g., the social media posts and related metadata) and, implementing an Applications Programming Interface (API) to translate the unstructured data 120 into a generic format 112 that is operations management engine-agnostic (i.e., capable of being processed by any operations management engine, e.g., Business Process Management (BPM) engines). In large entities, numerous disparate BPM engines may implement to manage operations/processes and each BPM engine may require data in a specific format for processing purposes. Similarly, as will be discussed infra., the translation engine 110 additionally provides for translating data received from the operations management engines into a generic format that is computer-mediated communication listener-agnostic (capable of being processed by any computer-mediated communication listener).

Server 50 is in network communication (i.e., intranet 60) with one or more servers 70, which additionally includes computing platform 100 having a memory 102 and at least one processor/processing device 104 in communication with the memory 102. The memory 102 stores operations management engine 130 that is executable by processor 104. It should be noted that in other embodiments of system 10 and other embodiments of the invention, the translation engine 110 stored in server 50 and the operations management engine(s) 130 stored in server(s) 70 may be stored and executed in more than two servers or applicable computing devices or in one single server or any other applicable computing device. Operations management engine 130, otherwise referred to herein as Business Process Management (BPM) engine, is configured to receive the unstructured data 120 in the generic format 112, and translate the unstructured data 120 from the generic format 112 to an operations management engine-specific format 114.

Additionally, operations management engine(s) 130 is configured to initiate transformation 140 of the unstructured data 120 into structured data 150. As will be discussed in more detail infra., in specific embodiments of the invention, such transformation 140 includes parsing the unstructured data for keywords and determining an unstructured case workflow based on the keywords. The unstructured case workflow may include identifying tasks, activities, queries, feedback and the like, communicating data related to such to the computer-mediated communication channels and receiving, in response responses/feedback that are in requisite structured format. Additionally, operations management engine(s) 130 is configured to determine one or more case types 160 based on the structured data and generate a structured case-type specific workflow(s) 170 for the applicable cases implementing the structured data 150.

Referring to FIGS. 2 and 3 a detailed block diagram of the computing platform 100 is depicted, in accordance with embodiments of the present invention. In addition to providing more details for the system and process, FIGS. 2 and 3 provide various optional embodiments of the system. As previously discussed, the computing platform 100, which may comprise one or more apparatus, devices or the like is configured to execute translation engine 76 and operations management engine(s) 130 (i.e., algorithms, such as applications, modules, routines, and the like. Computing platform 100 includes memory 102, which stores the engines 110 and 130 thereon. The memory 102 may comprise volatile and non-volatile memory, such as read-only and/or random-access memory (RAM and ROM), EPROM, EEPROM, flash cards, or any memory common to computer platforms). Moreover, memory 102 may comprise cloud storage, such as provided by a cloud storage service and/or a cloud connection service.

Further, computing platform 100 also includes one or more processors 104, which may be application-specific integrated circuits ("ASICs"), or other chipsets, logic circuits, or other data processing device(s). Processor 104 may execute an application programming interface ("API") (not shown in FIGS. 2 and 3) that interfaces with any resident programs (i.e., translation engine 110 and/or operations management engine 130) stored in the memory 102 of the computing platform 100.

Processor 104 may include various processing subsystems (not shown in FIGS. 2 and 3) embodied in hardware, firmware, software, and combinations thereof, that enable the functionality of the computing platform 100 and the operability of the computing platform 100 on the distributed computing network 20 and 60 (shown in FIG. 1). For example, processing subsystems allow for initiating and maintaining communications and exchanging data with other networked devices, such as web-based servers 30 and 40 (shown in FIG. 1). For the disclosed aspects, processing subsystems of processor 104 may include any subsystem used in conjunction with translation engine 76 and operations management engine(s) 130 and related, codes, routines, sub-routines, algorithms, sub-algorithms, modules, sub-modules thereof.

Computer platform 70 may additionally include a communications module (not shown in FIG. 3) embodied in hardware, firmware, software, and combinations thereof, that enables electronic communications between the computing platform 200 and other platforms, apparatus and/or devices, such computer resources 30 and database 40 (shown in FIG. 1). Thus, communication module may include the requisite hardware, firmware, software and/or combinations thereof for establishing and maintaining a network communication connection.

The processor 104 is configured to execute the computer-readable program codes 76 to receive a plurality of jobs 80, such as a list of jobs or the like, requiring execution by the computing resources, each job is associated with at least one data processing service/application.

Further, processor 104 is configured to execute translation engine 110, also referred to herein as core process framework, that is configured to receive unstructured data 120 or structured data 150 from the computer-mediated communication listener and/or, in some embodiments, directly from the computer-mediated communication channels (e.g., social media channels) and translate the data into a first generic format 112 that is operations management engine-agnostic (i.e., capable of being processed by any operations management engine that receives the unstructured data 120 or the structured data 150). Additionally, translation engine 110 is configured to receive structured data 150 (task data 148 including tasks, activities, queries, feedback and the like) from the operations management engines 130 and translate the data into a second generic format 116 that is computer-mediated communication listener-agnostic (i.e., capable of being processed by any computer-mediated communication listener that receives the structured data 150).

Processor 104 is further configured to execute operations management engine(s) 130, otherwise referred to herein as Business Process Management (BPM) engines. The engines are configured to receive, from the translation engine 110, the unstructured data 120 in the first generic format 112 and translates the unstructured data 120 to an operations management engine-specific format 130 for further processing.

In addition, operations management engine(s) 130 is configured to initiate transformation 140 of the unstructured data 120 to structured data 150 for the purpose of determining case type 160 and subsequently generating a case-type specific workflow 170. In specific embodiments of the invention, the transformation 140 includes implementing parser 142 that is configured to parse the unstructured data 120 for keywords 144 (i.e., words or phrases). The keywords 144 are used to identify tasks 146, activities, queries, feedback or the like associated with the data (i.e., a computer-mediated communication event, such as a social media posting or the like). In addition, in specific embodiments of the invention, the keywords 144 in the unstructured data 120 may be used to identify one or more initial case types 162. Identification of initial case types 162 may be instrumental in identifying tasks 146, activities, queries, feedback or the like associated with the computer-mediated communication event.

In response to identifying tasks 146, activities, queries, feedback or the like, the operations management engine 130 is further configured to initiate communication of task data 148 (i.e., data associated with the tasks 146, activities, queries, feedback or the like) to the computer-mediated communication listener 200, which in turn sends the task data 148 to the computer-mediated communication channels 210. In other embodiments of the invention, in which translation is not required, the task data 148 may be directly communicated to one or more computer-mediated communication channels 210.

In response to communication of the task data 148, the operations management engine 130 is configured to receive response data 149 from the computer-mediated channels that is in a structured format 150. In those embodiments in which the response data is received from the computer-mediated communication listeners 200 in first generic format 112, the operations management engine 130 may be further configured to translates the structured data 150 to an operations management engine-specific format 130 for further processing. The operations management engine 130 is configured to rely on the structured data 150 to determine one or more case types 160 associated with the structured data 150. In a large entity/enterprise, various different case types exist. Each case type signifies a different process that is required to address the event(s) associated with the case. For example, in a financial institution case types may include, but are not limited to, service requests, claims requests, complaints, transaction cancellation, account opening/closing, card replacement, misappropriation and the like. In specific embodiments of the invention, in which an initial case type(s) 162 is determined upon receipt of the unstructured data 120, the case type(s) that is determined upon receipt of the structured data 150 is defined as the final case type(s) 164. The final case type(s) 164 may be the same case types as the initial case type(s) or one or more of the final case type(s) 164 may be different from one or more of the initial case type(s) 162.

In response to determining the case type(s) 160, case type-specific management workflow(s) 170 are generated based on and/or including the structured data 150.

Referring to FIG. 3, in other embodiments of the invention, the operations management engine 130 may be configured to generate publication data 180 for publication on one or more computer-mediated communication channels 210. For example, in a large entity/enterprise, such as a financial institution or the like, the entity may generate profile data 182 and/or campaign data 184 for publication on one or more computer-mediated communication channels. Profile data 182 may be data associated with an individual or a group of individuals within the entity that offer a service or the like. Such profile data 182 may be published on a business-oriented social networking service or the like. Campaign data may be data associated with a service or product that the entity is promoting, for example, within a financial institution embodiment, the campaign may to be promote new customers or the like. In response to publishing such data, the operations management engine 130 is configured to receive feedback 190. Feedback data may include, but is not limited, messages associated with the individuals or group of individuals connected with profile data 182, orders/applications for a product, service, new customer or the like.

In specific embodiments of the invention in which the publication data 180 is communicated to the computer-mediated communications channels 210 via a computer-mediated communication listener 200, the operations management engine 130 is configured to communicate the publication data 180 to the translation engine 110 this configured to translate the publication data 180 to a second generic format 116 that is computer-mediated communication listener-agnostic (i.e., capable of being processed by any computer-mediated communication listener that receives the publication data 180). Moreover, in those embodiments of the invention in which the feedback data 190 is communicated to the operations management engine 130 via a computer-mediated communication listener 200, the listener(s) is configured to communicate the feedback data 190 to the translation engine 110 this configured to translate the feedback data 180 to a first generic format 112 that is operations management engine-agnostic (i.e., capable of being processed by any operations management engine that receives the feedback data 190).

Referring to FIG. 4, a flow diagram is presented of a method 400 for structuring computer-mediated communication data, determining case type(s) and generating case-type specific workflows, in accordance with embodiments of the present invention. At Event 410, unstructured computer-mediated communication data is received from one or more computer-mediated communication channels. The computer-mediated communication data may be a raw data feed of data associated with social media posts that are relevant to an associated entity/business. In specific embodiments of the method, the computer-mediated communication data is received indirectly from the one or more computer-mediated communication channels via a computer-mediated communication listener. As previously discussed, the computer-mediated communication listener is a service employed by the entity/business to identify/filter computer-mediated communication (e.g., social media communication) relevant to the entity/business.

At Event 420, the unstructured is translated into a first generic format that is operations management engine-agnostic (i.e., capable of being processed by any operations management/BPM engine that receives the unstructured data) and, at Event 430, communication of the unstructured data in the first generic format is initiated to one or more operations management engines.

At Event 440, the unstructured data in the first generic format is received by the one or more operations management engines and, at Event 450, the unstructured data is translated from the first generic format to an operations management-specific format.

At Event 460, transformation of the unstructured data to structured data is initiated. In specific embodiments of the method, such transformation includes parsing the unstructured data for keywords/phrases, identifying tasks, activities, queries, feedback and the like based on the keywords/phrases, communicating task data (including tasks, activities, queries, feedback) to the computer-mediated communication channels (typically via the listener) and, in response to communicating the task data, receiving, from the channels, results data that is in structured format.

At Event 470, in response to receiving the structured data, one or more case types are identified based on the responses in the structured data. As previously discussed, in a large entity/enterprise, various different case types exist. Each case type signifies a different process that is required to address the event(s) associated with the case. At Event 480, one or more case type-specific workflows are generated and initiated using the structured data.

Referring to FIG. 5 a schematic diagram is presented of a system for structuring computer-mediated communication data, determining case type(s) for the structured data and generating case type-specific workflows, in accordance with embodiments of the present invention. The system includes computer-mediated communication channels 210, e.g., social media websites and the like. Each of computer-mediated communication channels 210-1-210-N is configured to generate computer-mediated communication (e.g., social media postings and the like). The unstructured computer-mediated communication data 120 is communicated indirectly to an entity of interest (i.e., a business or other entity to which the computer-mediated communication data is relevant) via a computer-mediated communication listener 200, e.g., a social media listener service that is responsible for "listening" to various different social media channels are identifying/"mine" those communications (e.g., posting events, messages and the like) which are relevant to the entity based on the entity's predetermined relevancy criteria.

In turn the computer-mediated communication listener 200 communicates the unstructured data feed containing the entity-relevant communication data to a translation engine 110, otherwise referred to herein an core process framework, that is configured to translate the unstructured data to a generic format that is operations management engine-agnostic. Subsequently, the translation engine 110 communicates the unstructured data 120 to the operations management/BPM 130 engine. The operations management engine 130 is configured to translate the generic format to an operations management-specific format and initiate transformation of the unstructured data 120 to structured data 150. In this regard, the operations management engine 130 is configured to generate a dynamic unstructured case management workflow 220. The workflow 220 is generated by parsing the unstructured data 120 to identify keywords/phrases and using the keywords/phrases to identify tasks, activities, queries, feedback and the like associated with the keywords/phrases.

In response to such identification, the task/activity/query/feedback data 148 is communicated back to the computer-mediated communication channels 210. In the illustrated embodiments of FIG. 4, the task data 148 is communicated to the translation engine 110 where it is translated into a generic format that is computer-mediated communication listener-agnostic. In turn, the translation engine 110 communicates the task data 148 to the computer-mediated communication listener 200, which translates the task data 148 from the generic format to a listener-specific format. The computer-mediated communication listener 200 is configured to communicate the task data 148 to the applicable computer-mediated communication channels 210. It should be noted that the computer-mediated communication channel 210 that generated the initial computer-mediated communication data/event may be the same channel or a different channel to which the task data 148 is communicated.

In response to receiving the task data 148 that includes tasks, actions, queries and the like, the computer-mediated communication channel(s) 210 is directed to perform the associated tasks, actions, queries and the like, which may entail accessing requisite databases to retrieved information or contacting a user that generated the initial computer-mediated communication (e.g., social media posting) to obtain further information. The user may be contacted using the computer-mediated communication channel 210 (i.e., social media postings), via an associated messenger service or via a user-specified communication channel (e.g., text/SMS, voice or the like).

As a result of communicating the task data 148 to the computer-mediated communications channels 210 and obtaining information, response data is communicated back to the operations management engine 130 as structured data 150. In specific embodiments of the invention, the structured response data 150 is communicated indirectly via the computer-mediated communication listener 200. In turn the computer-mediated communication listener 200 communicates the structured data to the translation engine 110 that is configured to translate the structured data to a generic format that is operations management engine-agnostic. Subsequently, the translation engine 110 communicates the structured data 150 to the operations management/BPM 130 engine. The operations management engine 130 is configured to translate the generic format to an operations management-specific format.

In response to receiving the response data in structured format, the operations management engine 130 determines one or more case types 230-A-230-Z associated with the structured data and generates a structured case type-specific management workflow 170 for the structured data. In addition, the operations management workflow provides for end-to-end case lifecycle visibility 240 to the one or more computer-mediated communication channels 210, in which feedback may be provided to the channels at any point in the lifecycle of the assigned case.

Referring to FIGS. 6-10, shown are schematic diagrams of specific patterns for aligning computer-mediated communication with operations management processing, in accordance with embodiments of the present invention. The patterns herein shown and described are drawn to three different types of computer-mediated communication (e.g., social media content):

(1) Created content is content that is generated by an entity (e.g., business or the like) and published to computer-mediated channels (e.g., social media websites). In response to publishing the content, the computer-mediated channels provide structured feedback to the entity resulting in round-trip actions and structured case management workflows.

(2) Earned Content is content generated/posted on the computer-mediated communication channels by users (e.g., social media posters) that is monitored or crowd-sources. The data that is collected and communicated to the entity of interest is unstructured data that results in a dynamic unstructured case management workflow. Round Trip actions and further information provided from the users results in structured data being communicated to the entity of interest.

(3) Targeted Content is content directly targeted to a user of the computer-mediated communication channel, e.g., communicating messages to the user via a channel-associated messaging service or the like and receiving responses from the users, resulting in end-to-end structured case management workflows.

Figure 6:
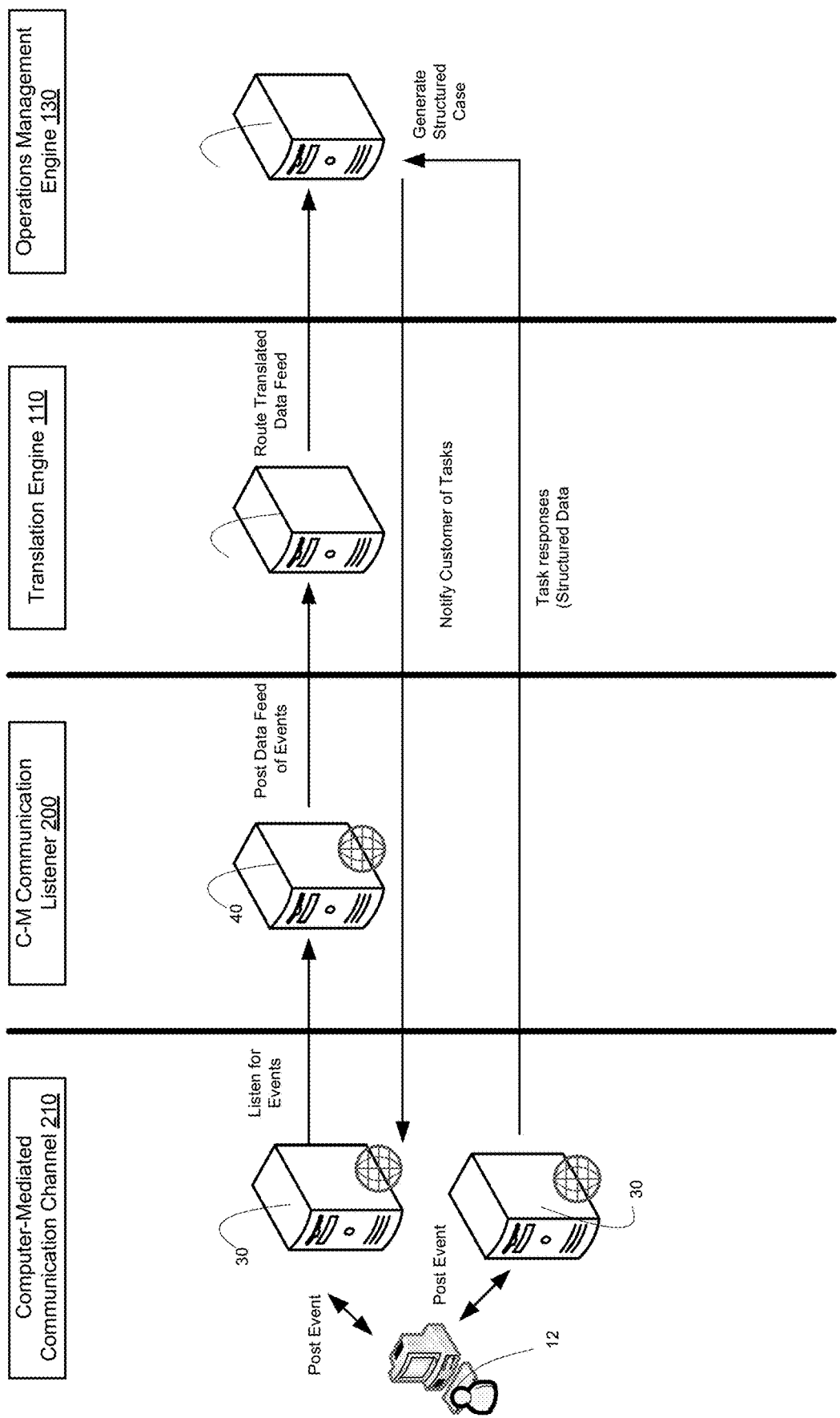

Referring to FIG. 6 a schematic diagram is shown of a use pattern for earned content in which a user generates/posts information relevant to the entity such as a compliant about the entity or a request for service, in accordance with embodiments of the present invention. In the complaint pattern, the complaint poses reputational risk to the entity and may create negative news about the entity. Therefore, the entity has a need to identify such events/postings and implement requisite corrective actions. In the service request pattern, the user posts a need for a service that the entity provides (with or without identifying the entity), as such a need exists to identify such events/posting and implement a process to streamline and classify these adhoc unstructured service requests. The user 12 posts an event to the computer-mediated communication channel 210. The event may be a compliant related to the entity or a generic request for a service provided by the entity.

The computer-mediated communication listener 200 is in communication with the various different web-based servers 30 associated with the channels 210 and listens for and collects/mines data associated with the events (i.e., user postings). Once data related to the event is mined by the computer-related communication listener 200, web-based server 40 posts a data feed of the events which is received by the translation engine 110 of server 50. As previously discussed the translation engine provides an API to integrate any operations management engine 130 irrespective of its language/configurations to the computer-mediated communication listener 200. The translation engine provides the further benefit of isolating the operations management engine(s) 130 from the computer-mediated communication listeners, thus providing added security. Once the unstructured data has been translated to a generic format, the translated data feed of the unstructured data is communicated by server 50 to server 60, which executes the operations management engine 130.

The operations management engine 130 is configured to convert/transform the unstructured data to structured data. Specifically, through parsing the unstructured data to identify keywords and the like, the operations management engine 130 is configured to identify tasks including actions, queries, feedback or the like for the computer-mediated communication channels. Task data is communicated to the user/poster via the computer-mediated communication channels and, in response to the user/poster replying to the tasks, task response data, in a structured format is communicated back to the operations management engine 130. In turn, the operations management engine is configured to identify one or more case types based on structured data available and applicable business rules and create a case type-specific structured workflow which is subsequently processed (i.e., issue resolution and/or providing requisite service). In addition, the operations management engine 130 provides for end-to-end case lifecycle visibility, via the computer-mediated communication channels, to the user/poster as it is being processed/resolved.

Figure 7:
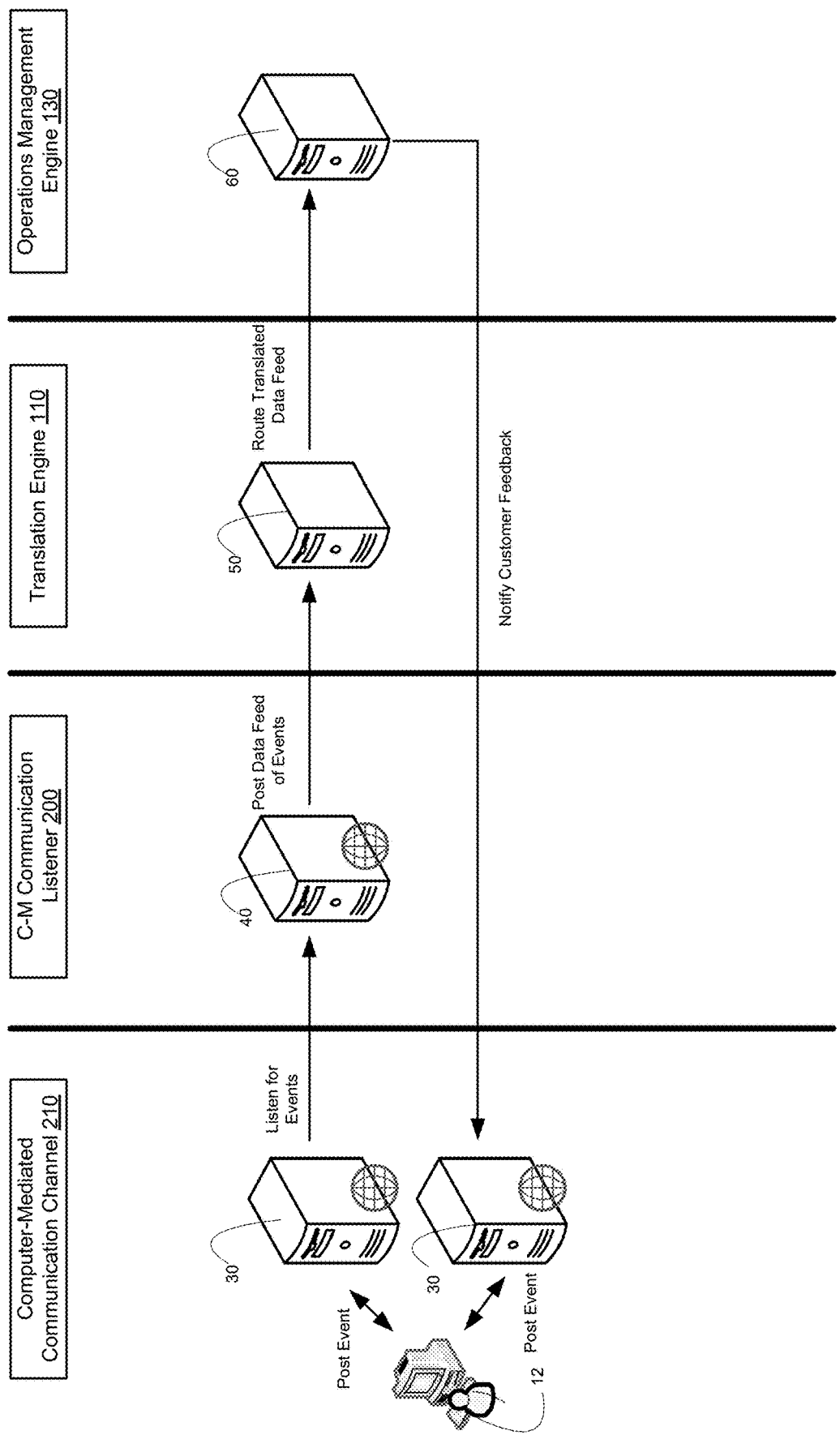

Referring to FIG. 7 a schematic diagram is shown of a use pattern for earned content in which a user generates/posts information about misappropriation occurring at the entity or otherwise affecting the entity. Therefore, there is a need by the entity to identify such events/postings and implement an operations management workflow that addresses the misappropriation.

The user 12 posts an event to the computer-mediated communication channel 210. The event may be associated with a misappropriation that they are aware of that has occurred at the entity, a related entity or may otherwise affect the entity. The computer-mediated communication listener 200 is in communication with the various different web-based servers 30 associated with the channels 210 and listens for and collects/mines data associated with the events (i.e., user postings). Once data related to the event is mined by the computer-related communication listener 200, web-based server 40 posts a data feed of the events which is received by the translation engine 110 of server 50. As previously discussed the translation engine provides an API to integrate any operations management engine 130 irrespective of its language/configurations to the computer-mediated communication listener 200. The translation engine provides the further benefit of isolating the operations management engine(s) 130 from the computer-mediated communication listeners, thus providing added security. Once the unstructured data has been translated to a generic format, the translated data feed of the unstructured data is communicated by server 50 to server 60, which executes the operations management engine 130.

In specific embodiments of the invention such as shown in FIG. 6, the operations management engine 130 is configured to convert/transform the unstructured data to structured data. Specifically, through parsing the unstructured data to identify keywords and the like, the operations management engine 130 is configured to identify tasks including actions, queries, feedback or the like for the computer-mediated communication channels. Task data is communicated to the user/poster via the computer-mediated communication channels and, in response to the user/poster replying to the tasks, task response data, in a structured format is communicated back to the operations management engine 130. In other embodiments of the invention, such as shown in FIG. 7, the operations management engine 130 is configured to parsing the unstructured data to identify keywords and the like, the operations management engine 130 is configured to identify the requisite case type(s) and determine the case type-specific structured workflows. In such embodiments of the invention, notification/feedback as the case being created may be provided to the user/poster via the one or more computer-mediated communication channels 210. In addition, the operations management engine 130 provides for end-to-end case lifecycle visibility, via the computer-mediated communication channels. to the user/poster of the case as it is being processed/resolved.

Figure 8:
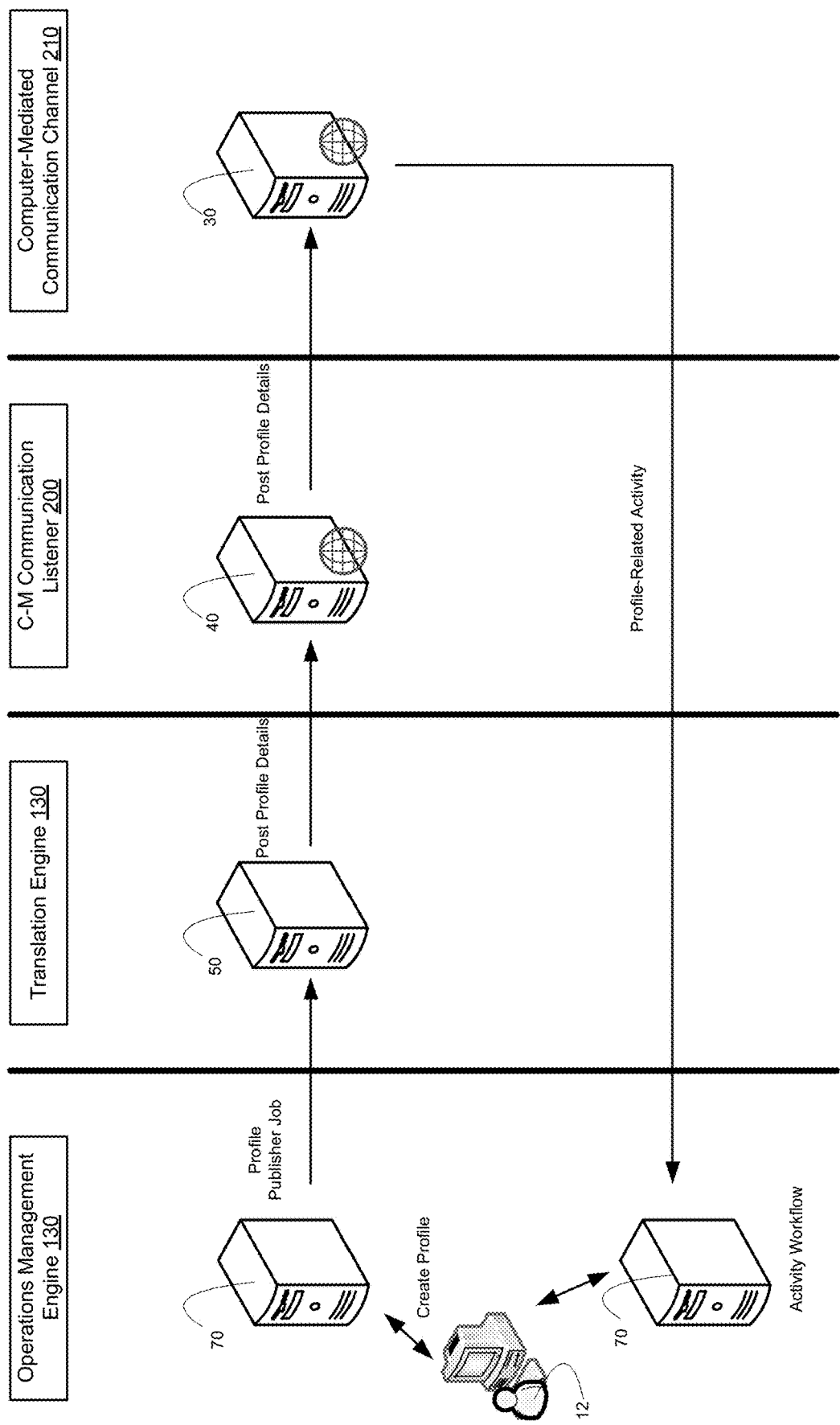
Figure 9:
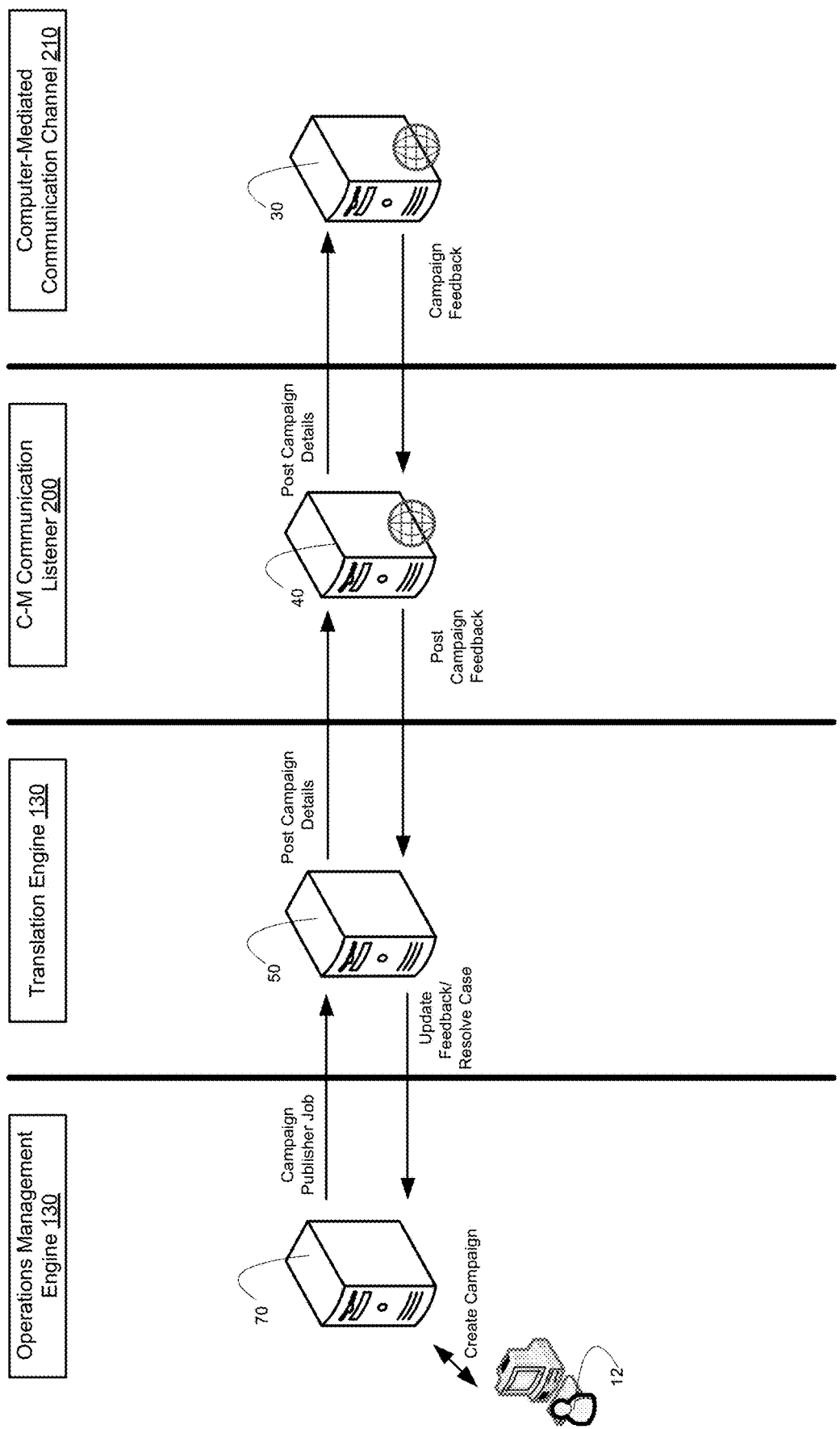

Referring to FIG. 8 a schematic diagram is shown of a use pattern for created content, in which profiles are published to computer-mediated communication channels 210, in accordance with embodiments of the present invention. The user 12 creates a profile, which is associated with an individual or a group of individuals within the entity. By publishing the profile on one or more computer-mediated communication channels the individual or group of individuals gain exposure through a social presence, exchange of ideas, information and the like. Once the profile has been created and is received by the operations management engine 130, a requisite approval process is executed, to insure compliance to regulations and internal communication rules/guidelines. In response to approval, a profile publisher job is executed by the operations management engine 130, which serves to communicate the profile to the translation engine 130.

The translation engine 130 is configured to translate the profile data into a generic format that is computer-mediated communication listener-agnostic and, in response, post profile details to a computer-mediated communications listener 200. The computer-mediated communications listener 200 is configured to, via an API, translate the generic format to a listener-specific format, and, subsequently communicate details of the profile to one or more designated computer-mediated communications channels 210. In addition the translation engine provides complete security isolation between the computer-mediated communication listeners and the operations management engines. In response to channel users interacting with the profile, profile-related activities may be communicated back to the entity. For example, in the event that channel user responds to a profile by requesting a service (e.g., opening an account or the like) a service request may be generated and sent to an applicable operations management engine 70, which generates a structured case workflow for the service request (e.g., a case for opening an account or the like). In addition, the operations management engine 130 provides for end-to-end case lifecycle visibility, via the computer-mediated communication channels, to the channel user/profile activity provider as the service request or the like is being processed/resolved.

Referring to FIG. 8 a schematic diagram is shown of a use pattern for created content, in which campaigns are published to computer-mediated communication channels 210, in accordance with embodiments of the present invention. The user 12 creates a campaign to gain exposure through a social presence, exchange of ideas, and obtain feedback and the like. Once the campaign has been created and is received by the operations management engine 130, a requisite approval process is executed, to insure compliance to regulations and internal communication rules/guidelines. In response to approval, a campaign publisher job is executed by the operations management engine 130, which serves to communicate the campaign to the translation engine 130.

The translation engine 130 is configured to translate the campaign data into a generic format that is computer-mediated communication listener-agnostic and, in response, post campaign details to a computer-mediated communications listener 200. The computer-mediated communications listener 200 is configured to, via an API, translate the generic format to a listener-specific format, and, subsequently communicate details of the campaign to one or more designated computer-mediated communications channels 210. In addition the translation engine 130 provides complete security isolation between the computer-mediated communication listeners 200 and the operations management engines 130. In response to channel users interacting with the campaign, campaign-related feedback may be communicated back to the entity.

In this regard, the feedback data may be listened for and mined by the computer-mediated communication listeners 200, which, in turn, posts details of the feedback to the translation engine 130. The translation engine 130 is configured to translate the feedback data to a generic format that is operations management engine-agnostic. As previously discussed, the translation engine 130 additionally provides secure isolation between the computer-mediated communication listeners 200 and the operations management engines 130. The translation engine 110 communicates the feedback data to the operations management engine 130, which in turn is configured to update the feedback and/or perform requisite actions based on the feedback (e.g., determine case type and create a case type specific structured case).

For example, in the event that channel user responds to a profile by requesting a service (e.g., opening an account or the like) a service request may be generated and sent to an applicable operations management engine 70, which generates a structured case workflow for the service request (e.g., a case for opening an account or the like). In addition, the operations management engine 130 provides for end-to-end case lifecycle visibility, via the computer-mediated communication channels, to the channel user user/profile activity provider as the service request or the like is being processed/resolved. In addition, the operations management engine 130 provides for end-to-end case lifecycle visibility, via the computer-mediated communication channels, to the channel user/campaign feedback provider as may be dictated based on the nature of the feedback (e.g., creating a case or the like).

Figure 10:
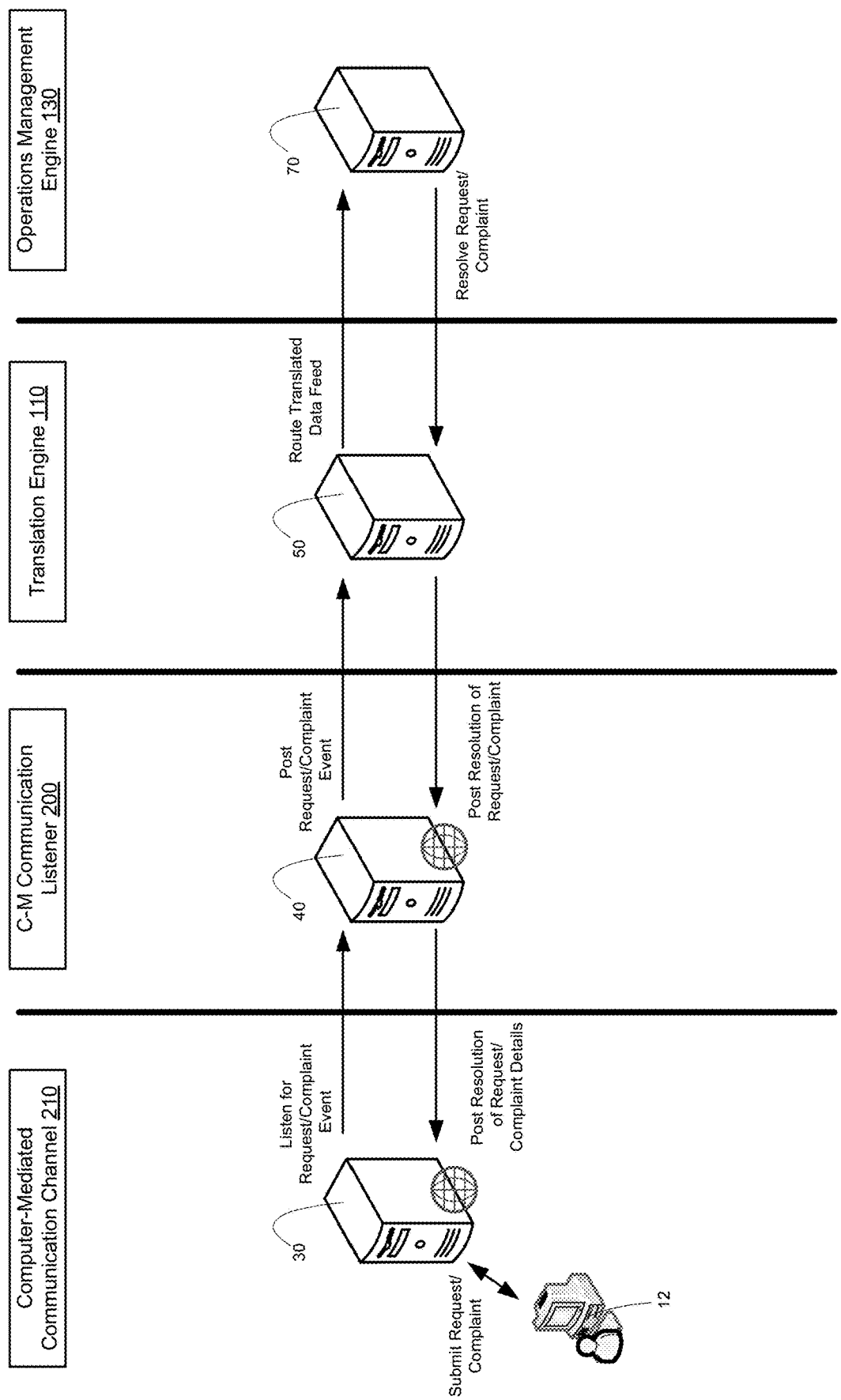

Referring to FIG. 10 a schematic diagram is shown of a use pattern for targeted content in which a user directly uses a communication mechanism within computer-mediated communication channel, such as a messaging service or the like to request a service (e.g., open an account or the like) or file compliant, in accordance with embodiments of the present invention. The service request or compliant. Which is case type-specific, is configured to open a direct structured workflow within the operations management engine. The user 12 submits a service request or files a complaint using a social media messaging service or some other communication mechanism.

The computer-mediated communication listener 200 is in communication with the various different web-based servers 30 associated with the channels 210 and listens for and collects/mines data associated with the service requests and/or complaints (i.e., user messaging inputs). Once data related to the service request/compliant is mined by the computer-related communication listener 200, web-based server 40 posts a details of the service request/compliant which is received by the translation engine 110 of server 50. As previously discussed the translation engine 110 provides an API to integrate any operations management engine 130 irrespective of its language/configurations to the computer-mediated communication listener 200. The translation engine 110 provides the further benefit of securely isolating the operations management engine(s) 130 from the computer-mediated communication listeners. Once the structured service data/compliant data has been translated to a generic format, the translated data feed of the structured data is communicated by server 50 to server 60, which executes the operations management engine 130.

The operations management engine 130 is configured to generate a structured case workflow to process the service request or resolve the compliant. The results of the service request or the compliant resolution is communicated back to the user of the computer-mediated communication channel. The results data may be communicated to the translation engine 110, which implements an API to translate the result data to a generic format that is computer-mediated communication listener-agnostic. The translation engine 110 posts details of the results to the computer-mediated communication listener 200, which translates the results data from the generic format to a listener-specific format. In response, the computer-mediated communication listener 200 posts resolution/results data to the user via the same, or in some embodiments a different, messaging service used to submit the service request and/or file the complaint. In addition, the operations management engine 130 provides for end-to-end case lifecycle visibility, via the computer-mediated communication channels, to the channel user/as may be dictated based on the nature of the feedback.

Thus, as described above, embodiments of the present invention provides for structuring computer-mediated communication data, such as social media data, determining a relevant operations management case/event type(s) based at least on the structured data and generating an applicable case type-specific workflow for the case implementing the structured data. In this regard, the present invention is capable of receiving, from various different computer-mediated communication channels and/or related listeners, unstructured data (e.g., raw data feeds) and transforming the unstructured data into structured data. In addition, the present invention provides for translating data originating at various different computer-mediated communication channels to a format that is operations management tool-agnostic and vice versa. Moreover, the present invention provides for, in response to structuring the computer-mediated communication data (i.e., the social media post data), determining one or more case/event types that are applicable to the computer-mediated communication data and generating one or more case-type specific associated case/event workflows implementing the structured data.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for structuring computer-mediated data and determining a case type associated with a structured computer-mediated data, the system comprising:
   a computing platform disposed within a distributed communication network and including a memory and at least one processor in communication with the memory;
   a translation engine stored in the memory, executable by the processor and configured to:
   receive, from one of a plurality of computer-mediated communication channels, unstructured data,
   translate the unstructured data into a first generic format that is operations management engine-agnostic, and
   initiate network communication of the unstructured data in the first generic format to at least one operations management engine; and
   the at least one operations management engine stored in the memory, executable by the processor and configured to:
   receive the unstructured data in the first generic format,
   translate the unstructured data from the first generic format to an operations management engine-specific format,
   initiate transformation of the unstructured data into structured data by:
     parsing the unstructured data to identify one or more predetermined keywords,
     identifying one or more tasks based on the predetermined keywords, wherein the one or more tasks include one or more queries to be made to at least one of the plurality of computer-mediated communication channels, and
     communicate the one or more queries to the translation engine,
   wherein the translation engine is further configured to:
     receive, from an operations management engine, the one or more queries,
     translate the one or more queries into a second generic format that is computer-mediated communication listener-agnostic, and
   wherein the operations management engine is further configured to:
     initiate network communication of the one or more queries in the second generic format to a computer-mediated communication listener, wherein the computer-mediated communication listener translates the one or more queries to a computer-mediated communication channel-specific format, and initiates communication of the one or more queries in the computer-mediated communication channel-specific format to the at least one of the plurality of computer-mediated communication channels, and receive, from the at least one of the plurality of computer-mediated communication channels via the computer-mediated communication listener, responses to at least one of the one or more queries, wherein the responses to the at least one of the one or more queries defines at least a portion of the structured data, in response to receiving the responses to the at least one of the one or more queries, determine a case type for the structured data based at least on the responses to the at least one of the one or more queries, and in response to determining the structured case type, generate a case workflow of the case type using the structured data.

2. The system of claim 1, wherein the translation engine is further configured to:
receive, from the computer-mediated communication listener, the responses to the at least one of the one or more queries,
translate the responses to the at least one of the one or more queries into the first generic format;
initiate network communication of the responses to the at least one of the one or more queries in the first generic format to the at least one operations management engine.

3. The system of claim 1, wherein the plurality of computer-mediated communication channels are further defined as social media communication channels.

4. The system of claim 1, wherein the plurality of computer-mediated communication channels are further defined as social media communication channels and the computer-mediated communication listener is further defined as a social media listener.

5. The system of claim 1, wherein the at least one operations management engine is further configured to:
determine an initial case type for the unstructured data, and
determine a final case type for the structured data, wherein the initial case type and the final case type are one of (i) a same case type, or (ii) different case types.

6. The system of claim 1, wherein the at least one operations management engine is further configured to:
publish at least one of profile data or campaign data to at least one of the computer-mediated communication channels.

7. The system of claim 6, wherein the at least one operations management engine is further configured to publish at least one of profile data or campaign data to at least one of the computer-mediated communication channels by:
initiating network communication of the profile data or the campaign data in the operations management engine-specific format to the translation engine.

8. The system of claim 7, wherein the translation engine is further configured to:
receive, from the at least one operations management engine, the profile data or the campaign data,
translate the profile data or the campaign data into the second generic format, and
initiate network communication of the profile data or the campaign data in the second generic format to the computer-mediated communication listener,
wherein the computer-mediated communication listener initiates publishing of the profile data or the campaign data to at least one of the computer-mediated communication channels.

9. The system of claim 6, wherein the at least one operations management engine is further configured to:
in response to publication at least one of the profile data or the campaign data to at least one of the computer-mediated communication channels, receive feedback data from the at least one of the computer-mediated communication channels.

10. The system of claim 9, wherein the translation engine is further configured to:
receive, from at least one of the computer-mediated communication channels, the feedback data,
translate the feedback data into the first generic format;
initiate network communication of the feedback data in the first generic format to the at least one operations management engine,
wherein the at least one operations management engine is configured to translate the feedback data from the first generic format to the operations management engine-specific format.

11. A computer-implemented method for structuring computer-mediated data and determining a case type associated with a structured computer-mediated data, the method implemented by one or more computing processors and comprising:
receiving, from one of a plurality of computer-mediated communication channels, unstructured data;
translating the unstructured data into a first generic format that is operations management engine-agnostic;
initiating network communication of the unstructured data in the first generic format to at least one operations management engine;
receiving, at the operations management engine, the unstructured data in the first generic format;
translating the unstructured data from the first generic format to an operations management engine-specific format;
initiating transformation of the unstructured data into structured data by:
parsing the unstructured data to identify one or more predetermined keywords;
identifying one or more tasks based on the predetermined keywords, wherein the one or more tasks include one or more queries to be made to at least one of the plurality of computer-mediated communication channels;
translating the one or more queries into a second generic format that is computer-mediated communication listener-agnostic;
initiating network communication of the one or more queries in the second generic format to a computer-mediated communication listener, wherein the computer-mediated communication listener translates the queries to a computer-mediated communication channel-specific format, and initiates communication of the queries in the computer-mediated communication channel-specific format to the at least one of the plurality of computer-mediated communication channels; and
receiving, from the at least one of the plurality of computer-mediated communication channels, responses to at least one of the one or more queries, wherein the responses to the at least one of the one or more queries defines at least a portion of the structured data;

in response to receiving the responses to the at least one of the one or more queries, determine a case type for the structured data based at least on the responses to the at least one of the one or more queries; and in response to determining the case type, generating a case workflow of the case type using the structured data.

12. The computer-implemented method of claim 11, wherein receiving the responses to the at least one of the one or more queries associated with the one or more tasks further comprises:

receiving, from the computer-mediated communication listener, the responses to the at least one of the one or more queries;

translating the responses to the at least one of the one or more queries into the first generic format; and initiating network communication of the responses to the at least one of the one or more queries in the first generic format to the at least one operations management engine.

13. The computer-implemented method of claim 11, wherein the plurality of computer-mediated communication channels are further defined as social media communication channels.

* * * * *